United States Patent Office 2,929,715
Patented Mar. 22, 1960

2,929,715

PROTEIN COMPOSITION

William J. L. Sutton, Dayton, Ohio, assignor to Monsanto Chemical Company, St. Louis, Mo., a corporation of Delaware No Drawing. Application March 7, 1957
Serial No. 644,441

1 Claim. (Cl. 99—14)

This invention relates to novel improved protein compositions which are characterized by a high foam volume and high foam stability, when the composition is whipped. More specifically this invention relates to compositions containing a protein material and a minor amount of an alkyl ester of an aliphatic polycarboxylic acid and an alkali metal polyphosphate.

The principal object of this invention is to provide protein compositions having improved whipping qualities. Another object of this invention is to provide protein compositions having improved stability as a whipped material. Still another object of this invention is to provide an improved dry-mix composition for products requiring a foamed protein base, as for example, bakery products such as angel food and sponge cakes. A further object is to provide protein compositions which are particularly suitable for use in the preparation of a large variety of food products, as hereinafter more fully exemplified. A still further object is to provide a protein base composition which can be whipped to a high specific volume and has good foam stability in the presence of relatively large amounts of sugar. Other objects will be apparent from the following disclosure.

It has now been found that a combination of an alkyl ester of an aliphatic polycarboxylic acid and a linear alkali metal polyphosphate effect a synergistic improvement to various protein compositions which are particularly useful due to their ability to be whipped to provide a protein foam. The aforesaid combination is also effective to provide foamed compositions which heretofore have not been regarded as suitable protein compositions for the preparation of products requiring a high degree of whipping ability and foam stability.

The instant invention is applicable to a large variety of protein compositions, as for example various dehydrated protein foods such as nonfat milk solids, fat-free soybean flour, dried egg-white solids, dried whole eggs, gelatin, soluble caseinates, and the like, which are suitable in dry-mix formulations such as angel food and sponge cakes, and in the production of numerous other food products such as meringues, fruit whips, toppings, candy, marshmallows, biscuits, and the like. The instant invention also provides improved whipped products even in the presence of a relatively large amount of fat as in whipping cream, ice cream, and vegetable fat desserts. Furthermore, the novel combination of the instant invention is also effective in the presence of relatively large quantities of sugar as hereinafter more fully exemplified.

The suitable alkyl esters of the aliphatic polycarboxylic acids can include all edible compositions which are characterized by an appreciable solubility in water, i.e. at least about 0.01 percent, and a maximum molecular weight of about 280. The polycarboxylic acids can be partially or fully esterified and can also be esterified with more than a single alcohol to provide a mixed ester. The alkyl group of the ester should be a low molecular weight group, for example, methyl and ethyl and the like, but the ethyl radical is preferred. The various aliphatic polycarboxylic acids which can be employed to provide the above class of compounds can be exemplified by the group consisting of malonic acid, succinic acid, glutaric acid, tartronic acid, malic acid, tartaric acid, citric acid, and the like. Illustrative specific compounds are diethyl malonate, diethyl succinate, diethyl glutarate, diethyl tartronate, diethyl maleate, diethyl d-tartrate, diethyl l-tartrate, diethyl racemate, triethyl citrate, monoethyl malonate, monoethyl succinate, monoethyl glutarate, monoethyl tartronate, monoethyl maleate, monoethyl d-tartrate, diethyl citrate, monoethyl citrate, dimethyl malonate, dimethyl succinate, dimethyl glutarate, dimethyl tartronate, dimethyl maleate, dimethyl d-tartrate, trimethyl citrate, dimethyl citrate, diethyl methyl citrate, ethyl methyl succinate, ethyl methyl maleate, and the like.

The quantity of the alkyl polycarboxylate can be varied from about 0.1 to about 1.0 percent by weight of the protein base material and preferably ranges from about 0.4 to about 0.6 percent thereof.

The linear alkali metal polyphosphates which are employed in this invention include any condensed phosphate containing the —P—O—P— chain formed by the sharing of oxygen atoms between adjacent phosphorus atoms. The chain length of said polyphosphates preferably can range from two phosphorus atoms up to about 200 phosphorus atoms or more and can contain up to several thousand phosphorus atoms. The alkali metal moiety of said polyphosphate is selected from the group consisting of sodium, potassium, and ammonium. It will be understood that the ammonium radical is often classified with the alkali metals for many purposes, and it is so classified in the instant invention. Suitable chain polyphosphates can thus be exemplified as sodium acid pyrophosphate, tetrasodium pyrophosphate, sodium tripolyphosphate, and longer chain sodium polyphosphate glasses wherein the number of phosphorus atoms, $n$, varies from about 4 up to several thousand, and preferably from about 4 up to about 200 or more, including sodium tetrapolyphosphate, sodium hexametaphosphate, and the various sodium phosphate glasses known as Graham's salts; tetrapotassium pyrophosphate, potassium tripolyphosphate, and longer chain potassium polyphosphates wherein $n$ varies from about 4 up to several thousand, e.g. the potassium Kurrol's salts; tetraammonium pyrophosphate, diammonium disodium pyrophosphate and the like. Mixed alkali metal phosphates are also included in the suitable chain polyphosphates as for example, various potassium-sodium phosphate glasses and the like.

The quantity of the alkali metal polyphosphate to be used in combination with the alkyl polycarboxylate can be varied from about 0.5 to about 5 percent by weight of the protein base material and preferably is employed in an amount of from about 1.5 to about 3.0 percent by weight of the protein base material.

A further advantage of the combination of the alkali metal polyphosphate and alkyl polycarboxylate as synergistic agents to improve the whipping ability of various protein compositions by increasing the foam volume and foam stability of said compositions is the materially improved tolerance for the presence of relatively large amounts of sugars in formulations containing the aforesaid whipping agents. The stability of the whipped composition can also be improved by the presence of relatively small amounts of various thickening agents, as for example, Irish moss extractives, gum arabic, gum karaya, gum tragacanth, guar gum, locust bean gum, soluble pectins and pectic acid, sodium alginates, and the like. These effects are more fully shown in the illustrative examples below.

Whereas the subject matter of this invention is directed primarily to edible compositions for human consumption, it is obvious that the invention is also applicable to other industrial uses of protein foams as in the production of fire extinguishing foams which are prepared from various hydrolyzed protein materials, protein foams for froth flotation in the refining of ores, and the like.

The general method employed to evaluate the relative effectiveness of various compositions as whipping aids for the preparation of high volume, stable protein foams was as follows: Two hundred fifty grams of cold tap water preferably below about 20° C. was measured into the bowl of a "Kitchen Aid" Model K5A mixer and the desired quantity of whipping agents dissolved therein by mechanically stirring with the wire whip for a few minutes. When the whipping agents were completely dissolved in the water the quantity of dried protein solids to provide the desired solids concentration was added to the solution in the mixing bowl and dispersed therein by slow agitation with the wire whip for about two minutes. Thereafter the mixture was whipped to a maximum foam volume using the wire whip at the No. 8 setting. The whip time generally varied from about 3 to about 5 minutes. The specific volume (ml./gm.) of the whipped composition was then determined. The relative foam stability was determined by placing 100 gm. of the foam in a large glass funnel and allowing the foam to stand over a period of time at about 20° C. to about 30° C., during which time the foam drainage was collected and measured.

Whereas the combination of the alkyl polycarboxylate and alkali metal polyphosphate are effective whipping aids over a relatively large range of protein solids concentration, it has been generally found that the lower concentrations provide a higher foam specific volume than do compositions containing a relatively large quantity of protein solids. Thus for example, improved whipped compositions can be prepared from nonfat milk solids wherein the ratio of water to dry protein solids varies from about 2:1 to about 6:1 or more, but the optimum concentration was found to be about 5:1. It is understood that the optimum concentration of the protein material may vary somewhat with the particular formulation selected, but can be readily ascertained.

The following examples are illustrative of the instant invention.

*Example 1*

A series of foamed protein compositions was prepared employing the general procedure described above. Fifty grams of nonfat milk solids was dispersed in 250 grams of water and thereafter whipped for 5 minutes in the presence of the whipping aids listed in the following table, wherein the quantity of the whipping aid is based on the weight of nonfat milk solids.

| No. | Whipping Aid | Specific Volume |
|---|---|---|
| 1 | None (Control) | 2.9 |
| 2 | 2% Sodium hexametaphosphate | 7.4 |
| 3 | 2% Tetrasodium pyrophosphate | 7.7 |
| 4 | 0.5% Triethyl citrate | 7.9 |
| 5 | 0.5% Triethyl citrate plus 2% sodium hexametaphosphate | 9.3 |

In another series of experiments conducted in substantially the same manner as above, except that the protein composition was only whipped for 3 minutes, the data were as indicated in the following table:

| No. | Whipping Aid | Specific Volume |
|---|---|---|
| 6 | 2% Sodium hexametaphosphate | 7.5 |
| 7 | 2% Sodium tripolyphosphate | 7.5 |
| 8 | 2% Sodium phosphate glass (n=55) | 7.6 |
| 9 | 3% Sodium phosphate glass (n=55) | 7.6 |
| 10 | 2% Sodium phosphate glass (n=55) plus 0.5% triethyl citrate | 9.1 |

The material synergistic effect of the combination of the sodium polyphosphate and the alkyl polycarboxylate is indicated by the data in the foregoing tables when considered in conjunction with the data in the following tables.

*Example 2*

In similar fashion to Example 1, two series of whipped nonfat milk solids compositions were prepared and evaluated as indicated in the following table:

| No. | Whipping Aid | Specific Volume | | Percent Foam Drainage | |
|---|---|---|---|---|---|
| | | ml./gm. | Percent increase | 15 Min. | 30 Min. |
| 11 | None (Control) | 3.8 | | 32.2 | 74.1 |
| 12 | 0.5% Diethyl d-tartrate | 4.9 | 29 | 0.0 | 26.4 |
| 13 | 0.5% Diethyl maleate | 5.0 | 32 | 22.2 | 83.3 |
| 14 | 0.5% Diethyl succinate | 5.3 | 39 | 29.6 | 77.9 |
| 15 | 0.5% Diethyl malonate | 5.5 | 45 | 5.7 | 29.2 |
| 16 | 0.5% Triethyl citrate | 5.8 | 53 | 27.6 | 96.3 |
| 17 | None (Control) | 3.4 | | 46.8 | 69.5 |
| 18 | 1% Tetrasodium pyrophosphate | 5.0 | 47 | 0.0 | 0.0 |
| 19 | 1% Tetrasodium pyrophosphate plus 0.5% diethyl malonate | 5.9 | 74 | 0.0 | 0.0 |
| 20 | 1% Tetrasodium pyrophosphate plus 0.5% diethyl succinate | 6.0 | 76 | 0.0 | 0.0 |
| 21 | 1% Tetrasodium pyrophosphate plus 0.5% triethyl citrate | 6.5 | 91 | 0.0 | 0.0 |

It is noted that all of the foamed compositions containing the alkyl polycarboxylates as whipping aids therein exhibit very poor foam stability and triethyl citrate which provides the best percentage increase in specific volume is actually poorest of the evaluated compounds in foam stability, even being inferior to the control in respect to the latter properly. It is further to be noted that the sodium pyrophosphate also effects an improved initial foaming, but is also relatively stable, and the combination of the two classes of whipping aids exhibit a very material synergistic improvement in the specific volume of the foamed composition while retaining the excellent foam stability characteristics.

*Example 3*

Another series of foamed protein compositions were prepared in a similar fashion to those compositions disclosed in Example 1, except that the protein concentration was increased to 100 grams of nonfat milk solids in 250 grams of water. The comparative data for these foamed compositions are listed in the following table.

| No. | Whipping Aid | Specific Volume | Percent Foam Drainage | | |
|---|---|---|---|---|---|
| | | | 15 Min. | 30 Min. | 60 Min. |
| 22 | None (Control) | 4.3 | 6.1 | 53.1 | 79.8 |
| 23 | 2% Tetrasodium pyrophosphate | 4.6 | 0.0 | 0.0 | 0.0 |
| 24 | 2% Sodium tripolyphosphate | 5.2 | 0.0 | 0.0 | 12.4 |
| 25 | 2% Sodium phosphate glass (n=14) | 5.4 | 0.0 | 0.0 | 17.9 |

*Example 4*

The effect of varying the concentration of a representative alkyl polycarboxylate was determined in another series of experiments wherein the foamed composition was prepared as disclosed in Example 3, except that the whipping time was 4 minutes. The comparative data for these foamed compositions are listed in the following table:

| No. | Whipping Aid | Specific Volume | Rate Foam Drainage (ml./hr.) |
|---|---|---|---|
| 26 | None (Control) | 4.7 | |
| 27 | 0.05% Triethyl citrate | 5.1 | |
| 28 | 0.15% Triethyl citrate | 5.6 | |
| 29 | 0.35% Triethyl citrate | 5.9 | |
| 30 | 0.50% Triethyl citrate | 6.3 | |
| 31 | 0.80% Triethyl citrate | 5.8 | |
| 32 | 1.00% Triethyl citrate | 5.2 | |
| 33 | None (Control) | 5.0 | 210 |
| 34 | 0.5% Triethyl citrate | 6.3 | 330 |
| 35 | 0.5% Triethyl citrate plus 1% sodium phosphate glass ($n=55$) | 6.5 | 200 |
| 36 | 0.5% Triethyl citrate plus 2% sodium phosphate glass ($n=55$) | 6.6 | 20 |
| 37 | 0.5% Triethyl citrate plus 3% sodium phosphate glass ($n=55$) | 6.2 | 0 |
| 38 | 3% Sodium phosphate glass ($n=55$) | 5.6 | 0 |

*Example 5*

The effect of the presence of sugar on the ability of the combination of the whipping aid to maintain a useful foamed composition was determined in a series of experiments which were conducted in a similar manner to those of Example 1, except for a whipping time of 4 minutes and the addition of varying amounts of sucrose as indicated in the following table, wherein the sugar is reported on the basis of the percentage by weight of the non-fat milk solids.

| No. | Percent Sucrose | Specific Volume | | |
|---|---|---|---|---|
| | | A | B | C |
| 39 | 0 | 6.5 | 8.1 | 9.6 |
| 40 | 5 | 5.4 | 7.7 | 9.2 |
| 41 | 10 | (*) | 7.2 | 8.8 |
| 42 | 15 | (*) | 6.7 | 8.5 |
| 43 | 20 | (*) | 5.7 | 7.9 |
| 44 | 25 | (*) | (*) | 7.4 |
| 45 | 30 | (*) | (*) | 7.0 |

A. Control (no whipping aid added).
B. 2% sodium phosphate glass ($n=55$) included.
C. 2% sodium phosphate glass ($n=55$) plus 0.5% triethyl citrate included.
*Failed to whip.

From the above table it is noted that the combination of the sodium phosphate glass and driethyl citrate with the protein material provides a materially superior composition which continues to be capable of effecting a large foam volume when whipped even in the presence of very large amounts of sugar. Thus even when the composition contains 30 percent of sugar, based on the weight of the protein-containing material, it is seen that the specific volume obtained is still superior to that of the control with no sugar present. It is further to be noted that without the addition of a whipping aid, the control composition failed to whip after the first addition of sugar.

Various other materials can be added to the compositions disclosed herein above. Thus if a heavier bodied product is desired a small amount of a suitable thickening agent can be included in the formulation. Also various coloring and flavoring agents and other modifying materials can be incorporated without departing from the scope of the present invention.

An illustrative example of a commercial formulation which is suitable for producing stable dairy whips, wherein the relative amount of each component is in parts by weight, is as follows:

| | Parts |
|---|---|
| Nonfat milk solids | 100 |
| Sucrose | 80 |
| Sodium phosphate glass | 1.5 |
| Triethyl citrate | 0.5 |
| Irish moss extractive [1] | 1.0 |

[1] Thickening agent such as "Seakem" type 402.

The dry-mix formulation can be readily prepared by uniformly blending the finely powdered dry sodium phosphate glass and Irish moss extractive with the nonfat milk solids or with the sugar and thereafter blending the initial premix with the sugar or nonfat milk solids, as the case may be. Then the liquid triethyl citrate can be slowly added, preferably by spray application to the mixture and mixing continued until the formulation is substantially uniform. The formulation can be packaged for commercial bakery or household use and can be readily converted to a stable dairy whip by simply mixing and subsequent whipping with cold tap water, e.g. in household use the housewife can add about 3 to 4 ounces of the aforesaid dry formulation to about one-half pint of cold water and disperse said dry formulation by mild stirring with a wire whip for about two minutes and thereafter whip said composition to a high volume, stable foam in about 3 to 5 minutes with a power mixer or egg-beater.

It will be noted that the specific volume is not consistent for the control samples between the various series of experiments. This is due primarily to the differences in the protein base material employed. However, all known variables were controlled within a series of experiments such that even small differences are significant. It should be further noted that the combination of materials of this invention are particularly effective with poor quality nonfat milk solids, i.e. the percent increase of specific volume by the addition of the combined whipping aids is generally greater for a poor quality low specific volume milk solid than for a high quality relatively high specific volume milk solid.

The whipping time employed in the foregoing examples ranged from about 3 minutes to about 5 minutes, but it is understood that minor variations can be tolerated and the optimum whipping time for a given system can be readily determined. Thus whipping times of up to about 10 minutes can be employed as necessary.

I claim:

An improved dry-mix protein base composition suitable for the preparation of foamed products comprising (1) nonfat milk solids; (2) about 2.0% by weight, based on the milk solids, of a sodium phosphate glass wherein $n$ is about 55; and (3) about 0.5% by weight, based on the milk solids, of triethyl citrate.

References Cited in the file of this patent

UNITED STATES PATENTS

| | | |
|---|---|---|
| 2,196,300 | Grettie | Apr. 9, 1940 |
| 2,267,911 | Grettie et al. | Dec. 30, 1941 |
| 2,588,419 | Sevall et al. | Mar. 11, 1952 |
| 2,637,654 | Kothe | May 5, 1953 |
| 2,671,730 | Finucane et al. | Mar. 9, 1954 |
| 2,692,201 | Conrad et al. | Oct. 19, 1954 |
| 2,716,606 | Patterson | Aug. 30, 1955 |
| 2,739,898 | Kumetat | Mar. 27, 7956 |